Figure 1A:
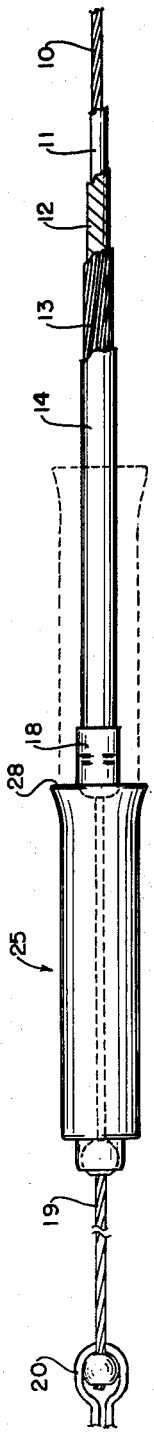

July 27, 1965

W. E. SEVRENCE 3,196,706

CONTROL CABLE PROTECTIVE ASSEMBLY

Filed Aug. 30, 1962

INVENTOR
WARREN E. SEVRENCE
BY
ATTORNEYS

United States Patent Office 3,196,706
Patented July 27, 1965

3,196,706
CONTROL CABLE PROTECTIVE ASSEMBLY
Warren E. Sevrence, Adrian, Mich., assignor to American Chain & Cable Company, Inc., New York, N.Y., a corporation of New York
Filed Aug. 30, 1962, Ser. No. 220,500
3 Claims. (Cl. 74—501)

This invention relates to a device for preventing moisture and other foreign matter from entering the interior of a control cable through the end of the cable casing where the end portion of a reciprocable core element is exposed. More particularly, it relates to a protective tubular hood pivotally attached to the core element end portion and extending rearwardly loosely about the end of the cable casing assembly.

Control cables in which a reciprocable core element transmits a push or a pull or both through a casing are often used under conditions where foreign matter may enter the casing and adversely affect their operation. It is especially common that moisture or dirt can gain entrance to the interior of the casing at its end where the core element is exposed and connected to an operating component. As a consequence, the inner parts of the cable rust or become clogged and its force transmission is greatly reduced in efficiency or destroyed altogether.

In some instances, such as where cables are used to operate carburetor throttles or brakes in the automotive field, the problem of providing the required protection for the interior of the cables is compounded by the fact that the outer end of a given cable assembly must be adaptable to various working conditions. For example, a throttle lever arm might be operated through more of an arc in one carburetor than in another and yet one control cable design must actuate both. Hence, whatever protective means are provided about the exposed core element end portion and the end of the cable casing, it should not inhibit the freedom of angular movement of the core element during operation. Also, a satisfactory protective end assembly should be free of fatigue stresses during operation, especially if it is to function under the greatly variable temperature conditions of an engine compartment.

Among the primary advantages of this invention is that it provides a control cable protective assembly which prevents any substantial entrance of moisture or dirt into the open end of the cable casing around the reciprocable core element, and which does so without in the least retarding the required angular movement of the core element end portion or imposing fatigue stresses on the protective device during operation.

Broadly stated, the environment of the invention is a control cable including a casing assembly and a core element which is reciprocable therewithin and which has an end portion extending from one end of the casing assembly. The improvement comprises a protective tubular hood attached at one end to the core element end portion in pivotal moisture-sealed engagement therewith and extending about the core element end portion toward and loosely surrounding the end of the casing assembly. In a preferred form of the improved protective end assembly, a ball element is affixed to th e core element end portion. The hood is elongated and comprises a resilient socket joint element fitted about the ball element in releasable universally pivotal moisture-sealed engagement therewith. A tubular body in the hood extends from this socket joint about the core element end portion toward and loosely surrounding the end of the cable casing.

Since the protective hood is secured to the core element end portion by a ball and socket connection, it in no way hinders angular movement of the core element end portion during operation. Consequently, the adaptability of the cable assembly to various levers and the like is totally unaffected by the hood. At the same time, any angular nodding action of the core element end portion cannot stress the hood, which is important from the standpoint of fatigue particularly in operation under widely varying temperatures. In addition, the hood and its ball and socket joint establishes an effective seal around the end of the casing assembly which prevents substantial dirt and moisture from entering the interior of the cable and rusting and clogging in its inner parts.

Figure 1B:
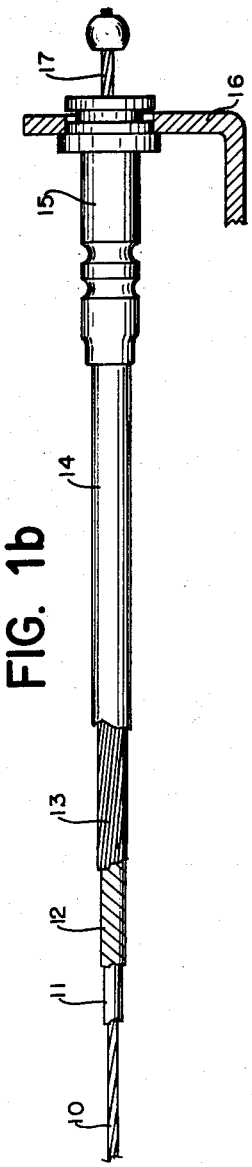
Figure 2:
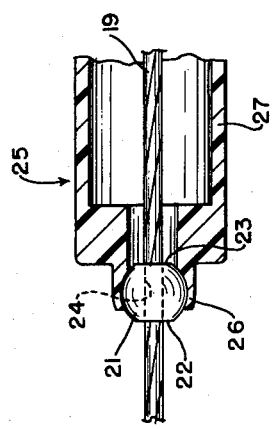

A preferred embodiment of the invention is described hereinbelow with reference to the accompanying drawing, wherein FIGS. 1A and 1B together constitute an elevation partly broken away of a control cable equipped with the new protective end assembly, and FIG. 2 is an enlarged fragmentary section of the ball and socket connection between the core element end portion and the protective hood.

Referring first to FIGS. 1A and 1B, a typical control cable is shown for operation of an automotive throttle linkage. It includes an inner stranded flexible metal core element 10. This core element is surrounded throughout the greater part of the cable length by a casing assembly made up of a liner 11 of polytetrafluoroethylene, a wrapping 12 of flat wire, an armored covering 13 of helically stranded long lay wires, and an outer sheath 14 of polyethylene. At the operator's end of the cable assembly is an end fitting 15 which may provide suitable anchorage to a frame 16. The core element 10 projects beyond the end fitting 15 at 17 for connection to a suitable actuating device.

At the end of the cable assembly remote from the operator's end, is an end fitting 18 affixed to the cable casing. In some instances, an anchorage similar to the frame 16 may be associated with the end fitting 18 at this remote end of the unit. In any event, an end portion 19 of the core element 10 extends from the end fitting 18 for attachment to an operated component, as for example a linkage on the end of a carburetor throttle arm 20. In this illustrative embodiment, a pull by the operator on the end portion 17 of the core element 10 causes the core element 10 to translate to the right as shown in the drawing and displace the throttle arm 20. A spring force may return the core element 10 and the throttle arm 20 to their original position. Depending upon the design of the throttle arm 20, the core element 10 is required to reciprocate through a given maximum stroke, and in doing so the exposed core element end portion 19 may nod or undergo angular movement with respect to the end fitting 18 and the casing assembly in order to follow an arcuate path taken by the throttle arm 20.

The improvement of the invention is shown in both FIGS. 1A and 1B and in FIG. 2. It comprises a metal ball element 21 formed with diametrically opposed flats 22 and 23 and a hole 24 extending completely therethrough from one flat to the other. The core element end portion 19 extends through the hole 24 in the ball element 21 and is fixed in relation thereto, as for example by crimping the ball element tightly about the core element end portion 19. The ball element 21 should be attached in this manner to the core element portion 19 a maximum distance along the core element from the fitting 18 at least equal to the required maximum stroke of the core element during operation.

A unitary elongated hood 25 is provided which is preferably of plastic material such as polyethylene. The hood includes a resilient socket joint element 26 at one end which is snapped about the ball element 21 in moisture-sealed releasable universally pivotal engagement therewith. The hood also includes a tubular body 27 extending from the socket joint 26 about the core element end portion 19 toward and loosely surrounding the end fitting 18. This tubular body 27 is of greater length than the maximum stroke of the core element so that even at the maximum extension of the core element, as shown in the solid lines in FIGS. 1A and 1B, the end of the hood body remote from the socket joint still surrounds at least part of the end fitting 18. When the core element 10 is fully retracted the hood 25 is in the position shown by dotted lines in FIG. 1A. It is advantageous that the tubular body 27 of the hood 25 be flared at its end 28 opposite the socket joint 26 to insure that the hood telescopes easily over the end fitting 18.

In the assembly of the new protective end components, the ball element 21 is slipped over the core element end portion 19 before any linkage or other attachments, such as those shown in FIG. 1A, are secured to the extremity of the end portion 19. The ball element 21 is then crimped radially to affix it firmly on the core element end portion 19 at the desired position. The hood 25 is then directed over the core element end portion 19 with its flared end 28 foremost until the socket joint 26 is adjacent the ball element 21. Thereupon, the socket joint 26 is forcibly displaced about the ball element 21 and its resiliency permits it to snap into mating engagement as shown in FIG. 2. During the operation of the cable assembly, reciprocation of the core element 10 may cause the core element end portion 19 to nod or move angularly with respect to the end fitting 18 as it follows the arcuate path of the throttle arm 20. However, this angular motion is accommodated by the ball and socket connection between the hood 25 and the core element end portion 19, and there is neither resistance to such nodding action of the core element nor imposition of fatigue stresses on the protection hood. At the same time, no substantial amount of moisture can penetrate the innerface within the ball and socket joint or progress up through the flared end 28 of the hood. As a result, foreign matter is unable to enter the interior of the cable assembly to rust or otherwise clog its interior parts.

Various modifications may of course be made in the foregoing embodiment without departing from the scope of this invention. For example, the end fitting 18 may be anchored in the manner shown by the frame 16 associated with the end fitting 15. The ball and socket arrangement may be reversed so that a socket element is affixed to the core element 19 and a ball element is formed at the end of the hood 25. The core element 10 may, of course, possess substantial rigidity so that it can transmit either a push or a pull.

I claim:

1. In a control cable including a casing, an end fitting secured to one end of said casing, and a core element reciprocable within said casing and having an end portion extending from said end fitting, a protective end assembly for said cable comprising:
   (a) a ball element affixed about said core element end portion; and
   (b) an elongated hood comprising:
      (i) a resilient socket joint element fitted about said ball element in releasable universally pivotal moisture-sealed engagement therewith, and
      (ii) a tubular body extending from said socket joint element about said core element end portion toward and loosely surrounding said end fitting.

2. In a control cable including a flexible casing, an end fitting secured to one end of said casing, and a flexible core element reciprocable through a given maximum stroke within said casing and having an end portion extending from said end fitting, a protective end assembly for said cable comprising:
   (a) a ball element formed with a hole extending completely therethrough, through which said core element end portion extends in fixed relation to said ball element; and
   (b) an elongated plastic hood comprising:
      (i) a resilient socket joint element at one end fitted about said ball element in moisture-sealed releasable universally pivotal engagement therewith, and
      (ii) a tubular body extending from said socket joint element about said core element end portion toward and loosely surrounding said end fitting, said tubular body being of greater length than said maximum stroke of said core element.

3. In a control cable including a flexible sheathed casing, an end fitting secured to one end of said casing, and a flexible metal core element reciprocable through a given maximum stroke within said casing and having an end portion extending from said end fitting, a protective end assembly for said cable comprising:
   (a) a metal ball element formed with diametrically opposed flats and a hole extending completely therethrough from one flat to the other through which said core element end portion extends in fixed relation to said ball element; and
   (b) a unitary elongated plastic hood comprising:
      (i) a resilient socket joint element fitted about said ball element in moisture-sealed releasable universally pivotal engagement therewith, and
      (ii) a tubular body extending from said socket joint element about said core element end portion toward and loosely surrounding said end fitting, said tubular body being of greater length than said maximum stroke of said core element, said tubular body being flared at its end opposite said socket joint element.

References Cited by the Examiner

UNITED STATES PATENTS

| 1,273,615 | 7/18 | Jacobs et al. | 74—501 |
|---|---|---|---|
| 1,496,610 | 6/24 | Shepard | 74—501 X |
| 1,828,868 | 10/31 | King | 74—566 X |
| 1,862,105 | 6/32 | Wharam | 74—501 X |
| 2,034,219 | 3/36 | Williams | 74—502 |
| 2,924,116 | 2/60 | Abbott | 74—501 X |

FOREIGN PATENTS

| 586,248 | 3/25 | France. |
|---|---|---|
| 670,987 | 1/39 | Germany. |
| 567,653 | 2/45 | Great Britain. |

BROUGHTON G. DURHAM, *Primary Examiner.*